US007430968B2

(12) United States Patent
Clark

(10) Patent No.: US 7,430,968 B2
(45) Date of Patent: Oct. 7, 2008

(54) FOLDING WORK PLATFORM

(76) Inventor: Roger T. Clark, 2620 Old Ansel School Rd., Greer, SC (US) 29651

( * ) Notice: Subject to any disclaimer, the term of this patent is extended or adjusted under 35 U.S.C. 154(b) by 463 days.

(21) Appl. No.: 11/246,214

(22) Filed: Oct. 11, 2005

(65) Prior Publication Data

US 2007/0080486 A1 Apr. 12, 2007

(51) Int. Cl.
*A47B 3/00* (2006.01)
*A47B 57/00* (2006.01)
*F16M 11/38* (2006.01)

(52) U.S. Cl. ......................... 108/115; 108/127; 108/93; 248/169

(58) Field of Classification Search ................. 108/138, 108/146, 173, 115, 161; 248/408, 168, 169; 269/88, 93, 91, 92, 244, 246, 99; 297/353
See application file for complete search history.

(56) References Cited

U.S. PATENT DOCUMENTS

| | | | | | |
|---|---|---|---|---|---|
| 798,371 | A | * | 8/1905 | Ward | 248/200.1 |
| 1,026,475 | A | * | 5/1912 | Tarbuck | 269/100 |
| 1,695,311 | A | * | 12/1928 | Young | 248/168 |
| 1,780,282 | A | * | 11/1930 | Tucker | 410/9 |
| 1,807,916 | A | * | 6/1931 | Jones | 312/351.3 |
| 2,044,235 | A | * | 6/1936 | Webber | 108/99 |
| 2,586,724 | A | * | 2/1952 | Sannebeck | 108/138 |
| 2,831,583 | A | * | 4/1958 | Wright et al. | 108/173 |
| 2,978,114 | A | * | 4/1961 | Halligan | 108/173 |
| 4,170,345 | A | * | 10/1979 | Townsend | 269/88 |
| 4,304,399 | A | * | 12/1981 | Szugda | 269/88 |
| 4,861,011 | A | * | 8/1989 | Varga | 269/99 |
| 5,244,193 | A | * | 9/1993 | Hehr | 269/99 |
| 5,584,254 | A | * | 12/1996 | Williams | 108/118 |
| 5,586,754 | A | * | 12/1996 | Williams | 269/99 |
| 5,810,342 | A | | 9/1998 | Kitamura et al. | |

OTHER PUBLICATIONS

Website Journal, "2½ Tristand Chain Vise", Model 425—Cat # 16703, Jun. 9, 2005, Ridge Tool Company, Elyria, Ohio, USA. www.Ridgid.com.

Website Journal, "6 Tristand Chain Vise", Model 460—Cat # 72037, Jun. 9, 2005, Ridge Tool Company, Elyria, Ohio, USA. www.Ridgid.com.

* cited by examiner

*Primary Examiner*—Janet M. Wilkens
*Assistant Examiner*—Timothy M Ayres
(74) *Attorney, Agent, or Firm*—Rader, Fishman & Grauer PLLC

(57) ABSTRACT

A folding work platform apparatus is used on a support surface and includes a work platform table and at least three legs. The work platform table has a top surface and a bottom surface disposed opposite the top surface and a side wall disposed between the top and bottom surfaces to define a thickness. The work platform table might have a groove formed into the top surface that extends longitudinally along a longitudinal axis. The at least three legs movably adjoin the bottom surface of the work platform table and are movable to and between a folded state wherein the at least three legs extended from the bottom surface generally parallel with one another and an extended state wherein the at least three legs extend from the bottom surface generally angularly away from the bottom surface and from one another for supporting the work platform table on the support surface.

22 Claims, 6 Drawing Sheets

FOLDING WORK PLATFORM

FIELD OF THE INVENTION

The present invention relates to a folding work platform.

BACKGROUND OF THE INVENTION

Particularly useful in the construction industry is a conventional folding work platform. Such a platform is typically in a form of a tripod with three legs that fold so the folding work platform can be easily stowed in a stowed state or that extend away from one another in an extended state so that the folding work platform can be placed on a support surface for use by a user. The area of the work platform table is relatively small in comparison with the footprint of the folding work platform defined by the three legs in the extended state. Typically, the folding work platform is integrated with a workpiece tool such as a chain vice for gripping a length of pipe or a V-shaped pipe support so that the length of pipe is secured and supported on the work platform table. Often, workpiece tools such as the chain vice mentioned immediately above are dedicated for a single use, for instance, dedicated to gripping a length of pipe.

Also, the conventional folding the work platform includes a sub-table that is disposed below the work platform table. Usually, links interconnect the sub-table with the three legs. In the extended state, the legs in conjunction with the sub-table and the links are restrained from extending beyond a selected size of footprint. In a folded state, the sub-table folds in a manner to permit the legs to fold i.e. move together in a generally parallel manner, so that the user can easily transport and/or stow the folding work platform.

SUMMARY OF THE INVENTION

A folding work platform apparatus is adapted for use with a tool workpiece to support the tool workpiece on a support surface and includes a work platform table, at least three folding legs, a sub-table, an adapter member and a fastener. The work platform table has a top surface, a bottom surface disposed opposite the top surface and a side wall extending between the top and bottom surfaces forming a thickness therebetween. The at least three legs movably adjoin the bottom surface of the work platform table and are movable to and between a folded state and an extended state. In the folded state, the at least three legs extend from the bottom surface generally parallel to one another and, in the extended state, the at least three legs extend from the bottom surface at an angle relative to the bottom surface and away from each other. The sub-table is connected to the at least three legs and is movable to and between a working position and a stowed position. In the working position, the sub-table is disposed apart from the bottom surface of the work platform table when the at least three legs are in the extended state. In the stowed position, the sub-table is disposed adjacent the bottom surface of the work platform table when the at least three legs are in the folded state. The adapter member includes a flat plate with a top adapter surface and an opposite bottom adapter surface with at least one adapter hole and a fastener hole formed into and through the top and bottom adapter surfaces. The fastener releasably fastens the adapter member to the work platform table and the fastener is sized to extend through the fastener hole to releasably connect the adapter member and the work platform table together.

DETAILED DESCRIPTION OF THE EXEMPLARY EMBODIMENTS

Hereinafter, embodiments of the present invention will be described with reference to the attached drawings. The structural components common to those of the prior art and/or the structural components common to respective embodiments of the present invention will be represented by the same symbols and repeated description thereof will be omitted.

Figure 1:
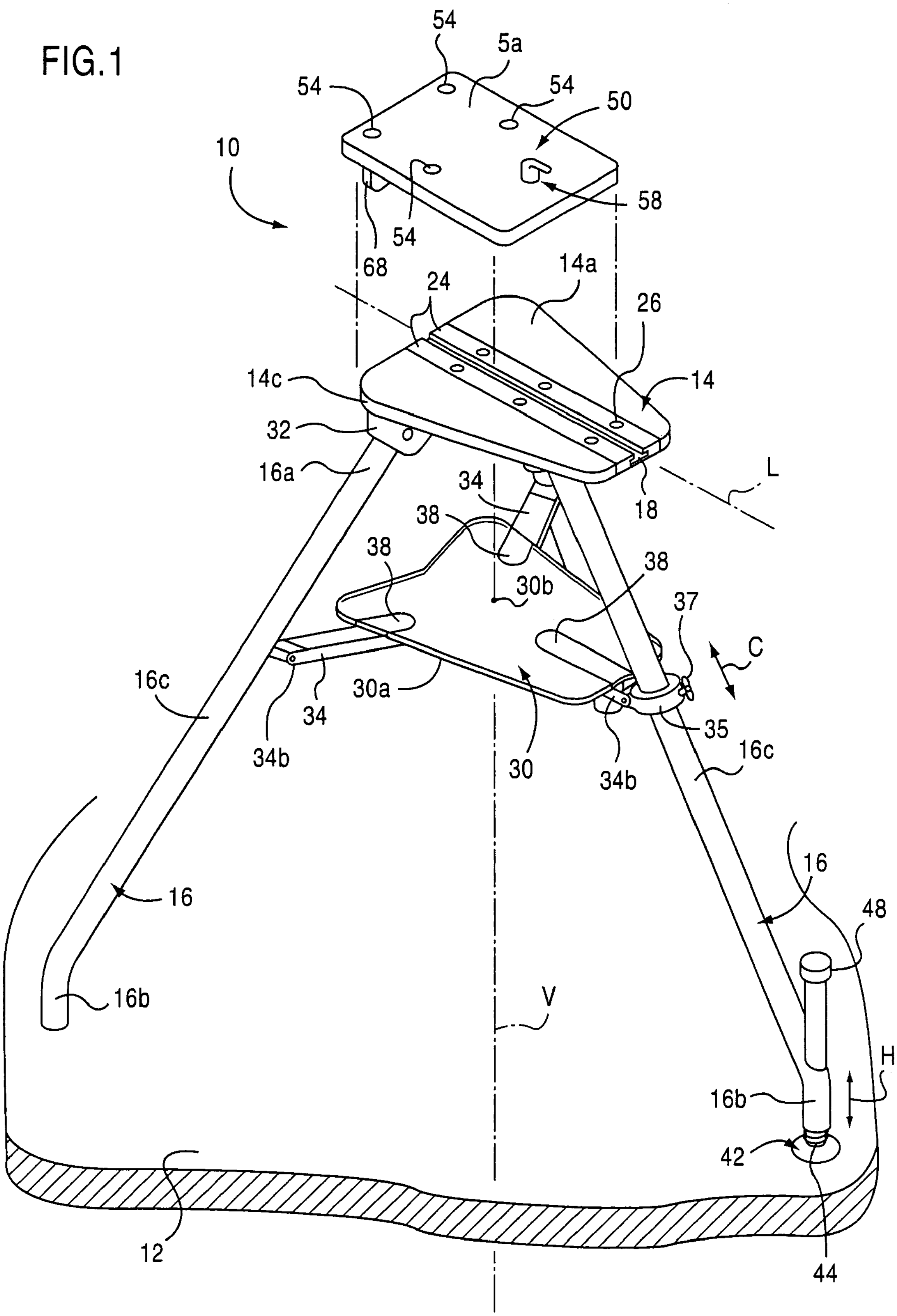
FIG. 1 is a partially exploded perspective view of a first exemplary embodiment of a folding work platform of the present invention with an adapter member and with its legs in an extended state as viewed from above.
Figure 2:
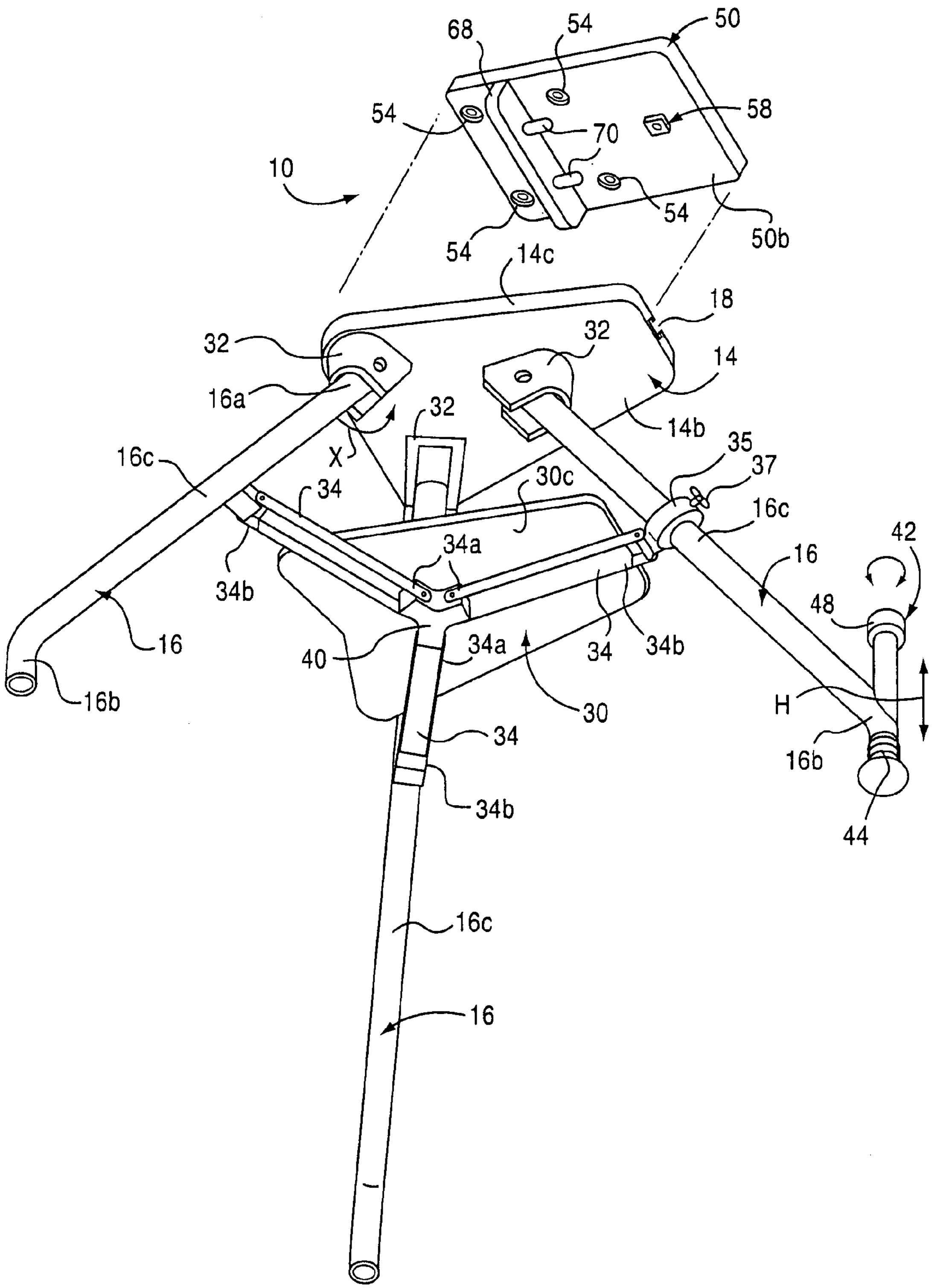
FIG. 2 is a partially exploded perspective view of the first exemplary embodiment of the folding work platform of the present invention of FIG. 1 as viewed from below.
Figure 3:
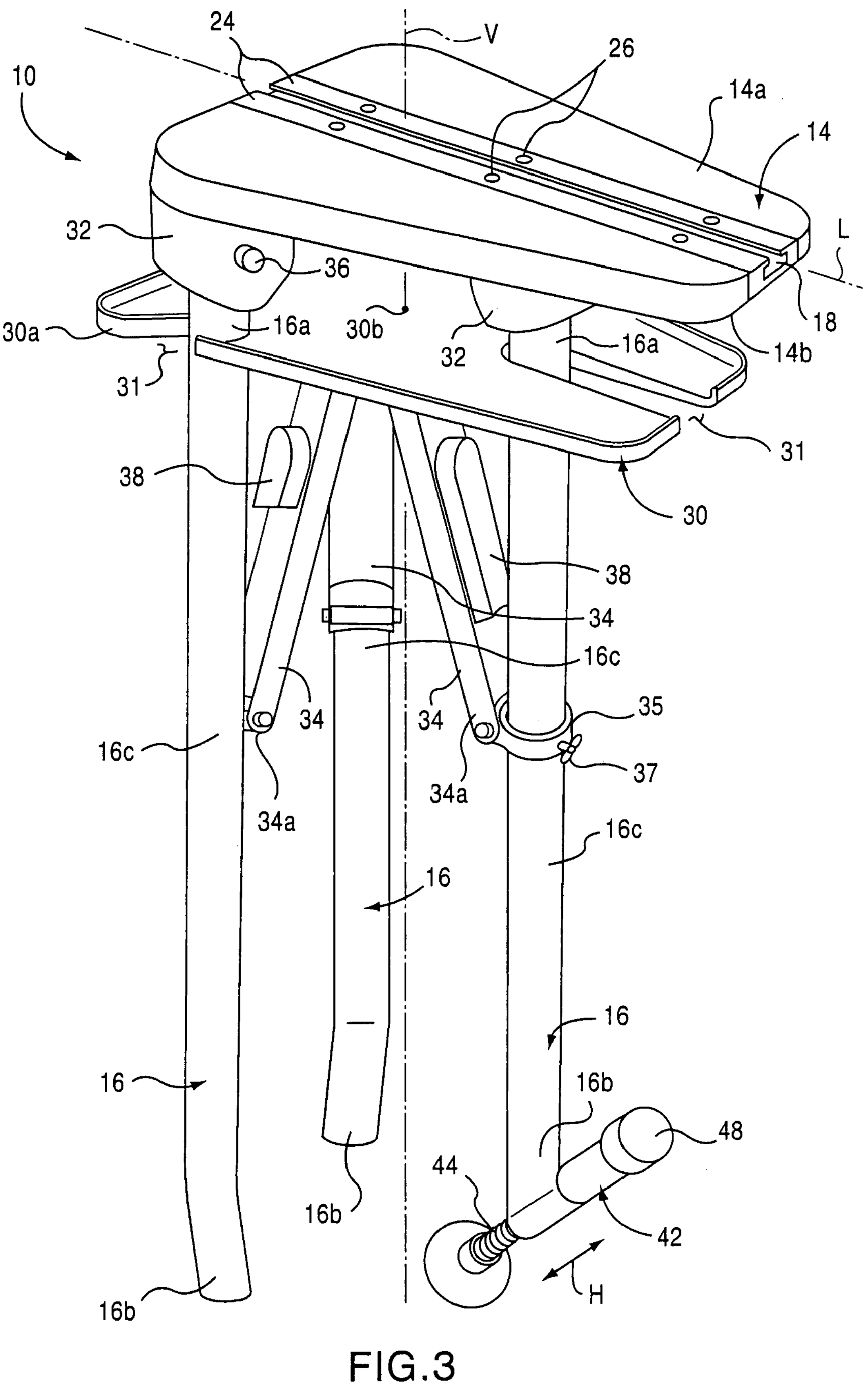
FIG. 3 is a partially exploded perspective view of the first exemplary embodiment of the folding work platform of the present invention with its legs in a folded state.

A first exemplary embodiment of a folding work platform apparatus 10 of the present invention is hereinafter described with reference to FIGS. 1-7. As best shown in FIGS. 1-3, the folding work platform apparatus 10 is adapted for use on a support surface 12. The folding work platform apparatus 10 of the first exemplary embodiment of the present invention includes a work platform table 14 and three legs 16 forming a tripod arrangement. However, one of ordinary skill in the art would appreciate that the folding work platform apparatus 10 includes at least three legs and might include four or more legs. The work platform table 14 has a top surface 14*a* and a bottom surface 14*b* disposed opposite the top surface 14*a* and a side wall 14*c*. The side wall 14*c* is disposed between the top surface 14*a* and the bottom surface 14*b* to define a thickness "t" therebetween as a shown in FIG. 4. As best shown in FIG. 5, the work platform table 14 has a groove 18 formed into the top surface 14*a* that extends longitudinally along a longitudinal axis L. Although not by way of limitation, the groove 18 extends completely across the top surface 14*a* and through the side wall 14*c* at opposing locations.

The three legs 16 movably adjoin the bottom surface 14*b* of the work platform in the table 14 and are movable to and between a folded state as shown in FIG. 3 and an extended state as shown and FIGS. 1 and 2. In the folded state, the three legs 16 extended from the bottom surface 14*b* generally parallel with one another and with a vertical axis V illustrated in FIG. 3. In the extended state, the three legs 16 extend from the bottom surface 14*b* generally angularly away from the bottom surface 14*b* at an angle X (FIG. 2) and from one another for supporting the work platform table 14 on the support surface 12 as best illustrated in FIGS. 1 and 2.

Figure 5A:
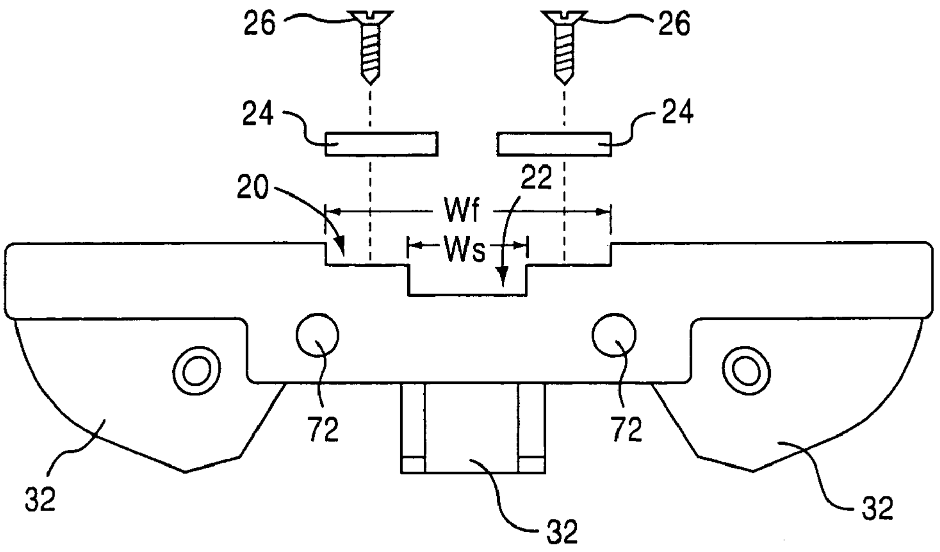
FIG. 5A is an enlarged partial front elevational view of the work platform table with a pair of strip members and screws exploded therefrom.
Figure 5B:
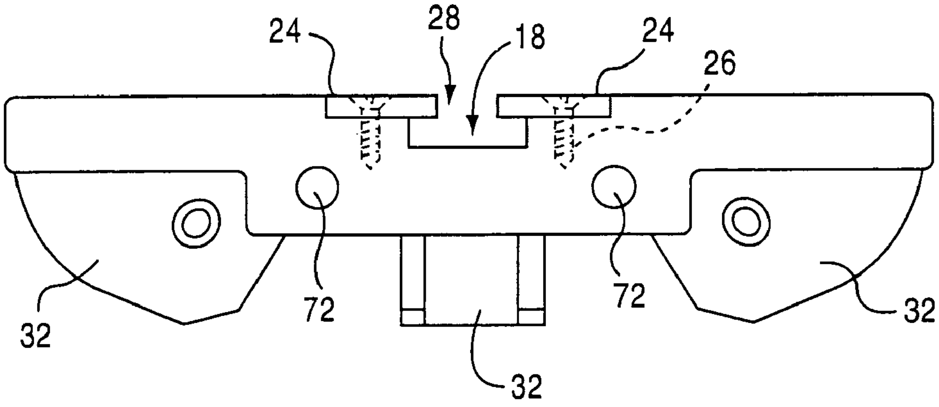
FIG. 5B is a partial front elevational view of the work platform table with a pair of strip members and screws assembled thereto forming an inverted T-shaped groove.

With reference to FIG. 5B, the groove 18 as viewed in cross-section forms an inverted T-shape although a skilled artisan would appreciate that other configurations of the groove might be useful without departing from the spirit of the invention. With reference to FIG. 5A, the groove 18 includes a first channel having a first width Wf and a second channel 22 disposed below the first channel 20 that has a second width Ws being less than the first width Wf. The second channel 22 is disposed centrally relative to the first channel 20 as viewed in cross-section in FIGS. 5A and 5B.

In FIGS. 1, 3, 5A and 5B, a pair of longitudinally-extending flat strip members 24 are positioned longitudinally in the first channel 20 and are connected to the work platform table 14 by conventional screws 26 to form a continuous planar surface with the top surface 14*a* of the work platform table 14. The strip members 24 are fabricated from a sturdy material such as brass or other metal material. The pair of strip members 24 are disposed apart from one another in the first channel 20 to partially cover the second channel 22 and to form a gap 28 therebetween in the first channel 20. It is appreciated that the gap 28 and the second channel 22 form the inverted T-shaped groove 18 in the top surface 14*a* of the work platform table 14.

Illustrated in FIGS. 1-3, the folding work platform apparatus 10 includes a sub-table 30. The sub-table 30 is positioned below the bottom surface 14*b* of the work platform table 14 and is movable between a working position and a stowed position. In the working position as shown in FIGS. 1 and 2, the sub-table 30 is disposed away from the bottom surface 14*b* of the work platform table 14. In the stowed position, the sub-table 30 is disposed adjacent the bottom surface 14*b* of the work platform table 14 as illustrated in FIG. 3. The sub-table 30 includes a plurality of slots 31 that are sized for receiving a respective one of the three legs 16 when the three legs 16 are collapsed into in the folded state as shown in FIG. 3. Again, with reference to FIG. 3, each slot 31 extends from an outer periphery 30*a* of the sub-table 30 toward a center portion 30*b* of the sub-table 30.

As illustrated in FIGS. 1-5B, three support members 32 are connected to the bottom surface 14*b* of the work platform table 14 and will be discussed further below. However, a skilled artisan would appreciate that there is one support member for each leg and, therefore, a folding work platform apparatus having four legs would have four support members.

With reference to FIGS. 1-3, each one of the three legs 16 include a connecting leg portion 16*a*, a support leg portion 16*b*, and an intermediate leg portion 16*c* disposed between the connecting leg portion 16*a* and the support leg portion 16*b* and three links 34. Although not by way of limitation, respective ones of the support leg portions 16*b* bend slightly relative to the respective intermediate leg portions 16*c* as shown towards the lower part of each leg. The three links 34 interconnect the sub-table 30 and the intermediate leg portions 16*c* of a respective one of the three legs 16. Again, a skilled artisan would appreciate that the number of links would, most likely, correspond to the number of legs used for the folding work platform apparatus. For the folding work platform apparatus 10 of the present invention, a respective one of the three support members 32 is configured to receive a connecting leg portion 16*a* of a respective one of the three legs 16. For the first embodiment of folding work platform apparatus 10 of the present invention, each one of the three support members 32 is in a form of a hinge support. Although not by way of limitation, each hinge support is integrally formed with the bottom surface 14*b* of the work platform table 14. Further, each one of the connecting leg portions 16*a* are pivotably connected to a respective one of the hinge supports by a pin 36 to shown by way of example in FIG. 3. A skilled artisan would appreciate that a respective pin 36 extends through each respective hinge support and each respective connecting leg portion 16*a* to form a hinge so that the legs 16 can pivot to and between the folded state and the extended state. Furthermore, a skilled artisan would appreciate that any hinge arrangement that would permit the legs to pivot to and between the folded state and the extended state can be used without departing from the spirit of the invention. Thus, conventional hinges as well as a ball-and-socket structure can be used in lieu of the hinge supports and pins as described hereunder.

As illustrated in FIGS. 1 and 3, a plurality of sub-table insert sections 38 are formed on respective ones of the three links 34. Each sub-table insert section 38 is sized and adapted to be received by a respective one of the plurality of slots 31 when the three legs 16 are in the extended state. In FIGS. 1 and 2, a first end 34*a* of a respective one of the three links 34 is pivotably adjoined to a sub-table bottom surface 30*c* (FIG. 2) of the sub-table 30 and a second end 34*b* is disposed opposite the first end 34*a* of a respective one of the three links 34 is pivotably adjoined at the intermediate portion 16*c* of respective ones of the three legs 16. By way of example only and not by way of limitation, the first and second ends 34*a* and 34*b* respectively are hingedly connected to the sub-table bottom surface 30*c* and the intermediate portion 16*c* by a pin arrangement. More particularly, the first ends 34*a* of the links 34 are hingedly connected by pins to a Y-shaped mounting block attached to the sub-table bottom surface 30*c* as shown in FIG. 2.

Additionally, with reference to FIGS. 1-3, one of the links 34 is pivotally connected to a collar 35 surrounding one of the legs 16. The collar 35 is slidable upwardly or downwardly along the leg 16 as shown by arrow C in FIG. 1. The collar 35 is releasably connected to the one leg 16 by a screw element 37 shown in a form of a winged screw. With this arrangement, the sub-table 30 can be adjusted to achieve a level or near-level state as would be understood by one of ordinary skill in the art.

In FIGS. 1-3, a height adjustment mechanism 42 is connected to a selected one of the three legs 16. The height adjustment mechanism 42 is operative to raise or lower the support leg portion 16*b* of one of the three legs 16 as illustrated by the double-headed arrow H. Although not by way of limitation, the height adjustment mechanism 42 includes a threaded shaft 44 that is threadably engaged with the support leg portion 16*b* of the selected leg 16. One end of the threaded shaft 44 includes a foot element 46 for contacting the support surface 12 as shown in FIG. 1 and an opposite end of the threaded shaft 44 includes a knob 48 for rotating the threaded shaft 44 in a clockwise direction or a counter-clockwise direction as illustrated by arrow R in FIGS. 1 and 2. When the knob 48 is rotated, the selected leg 16 is raised or lowed for adjusting the height of the folding work platform 10 depending upon the direction of rotation of the knob 48.

Figure 4:
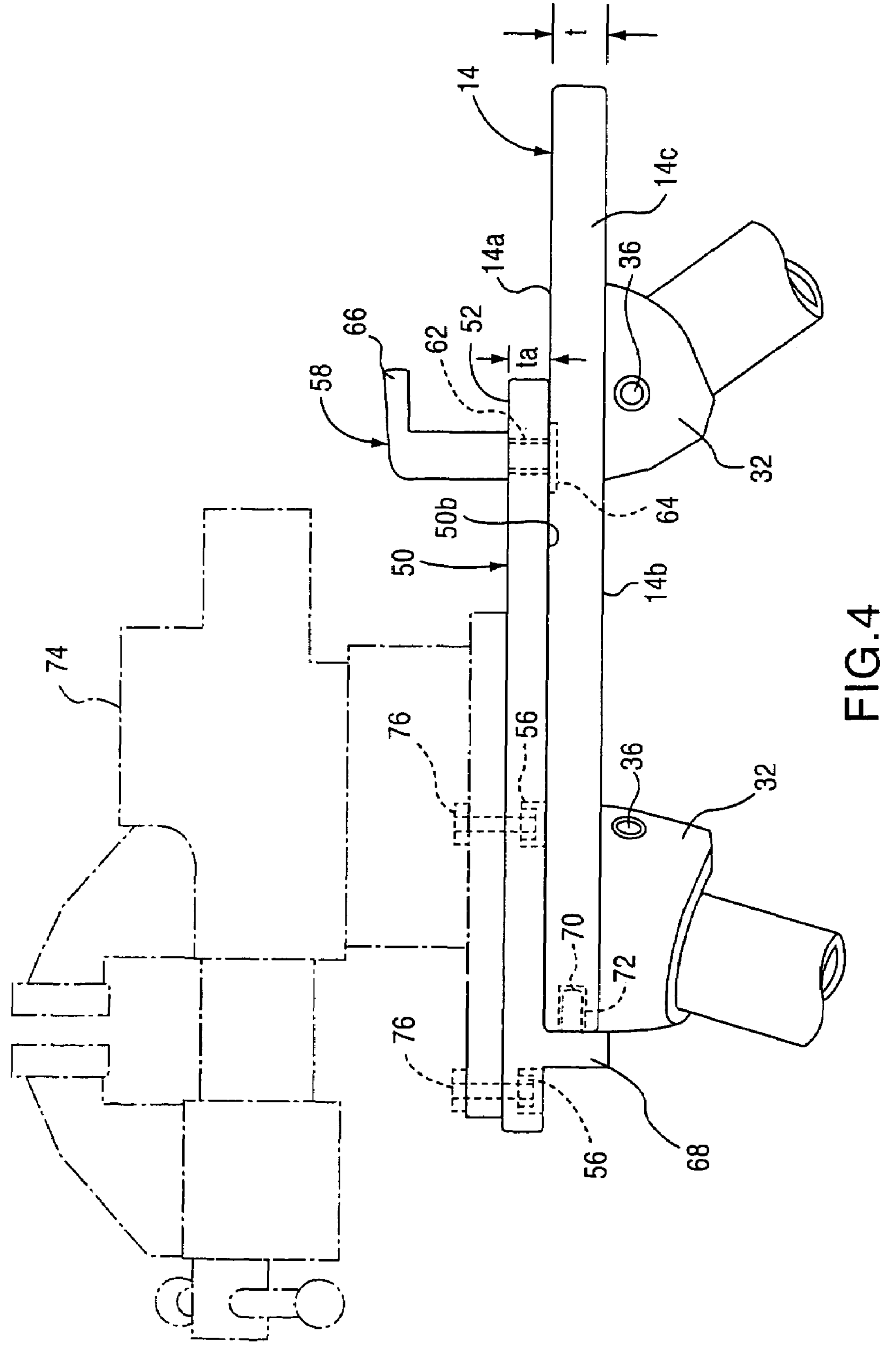
FIG. 4 is an enlarged partial side elevational view of the first exemplary embodiment of the folding work platform of the present invention with the adapter member releasably mounted on a work platform table with a phantomly-drawn tool workpiece mounted on the adapter member.

With reference to FIGS. 1, 2 and 4, the folding work platform apparatus 10 of the present invention includes an adapter member 50. The adapter member 50 is operative to releasably connect to the work platform table 14 and includes a flat plate 52 with a top adapter surface 52*a* and an opposite bottom adapter surface 52*b* defining an adapter thickness "ta" therebetween as best shown in FIG. 4. As best shown in FIG.

4, the bottom adapter surface 52*b* facially contacts the top surface 14*a* of the work platform table 14 when the adapter member 50 is releasably connected thereto. As the shown in FIGS. 1 and 2, the adapter member 50 includes four adapter holes 54 that extend through and between the top adapter surface 52*a* and the bottom adapter surface 52*b*. However, one of ordinary skill in the art would appreciate that the adapter member 50 might include only one adapter hole 54. With reference to FIG. 2, each adapter hole is counter-sunk into the bottom adapter surface 52*b* so as to accommodate a respective nut 56 drawn in phantom in FIG. 4.

Figure 6:
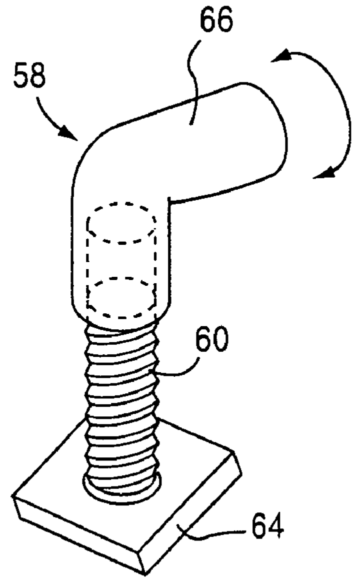
FIG. 6 is a perspective view of a fastener for releasably fastening the adapter member and the work platform table together.

As best shown in FIGS. 4 and 6, a fastener 58 releasably connects the adapter member 50 to the work platform table 14. The fastener 58 includes a threaded shaft 60 sized to be slidably received in a fastener hole 62 formed in the flat plate 52 of the adapter member 50 that extends into and through the top adapter surface 52*a* and the bottom adapter surface 52*b* as shown in FIG. 4. Also, the fastener 58 includes a retainer element 64 and a thumbscrew 66. The retainer element 64 is connected to one end of the threaded shaft 60 and sized for slidable insertion along the groove 18. The retainer element 64 could be either fixedly connected or rotatably connected to the one end of the threaded shaft 60. The thumbscrew 66 is threadably connected to the other end of the threaded shaft 60. When the adapter member 50 is arranged on the work platform table 14 a shown in FIG. 4, a skilled artisan would easily comprehend that the thumbscrew 66 can be rotated to releasably fasten the adapter member 50 on to the work platform table 14 thereby effectively clamping the adapter member 50 and the work platform table 14 together. In other words, upon advancing the thumbscrew 66 when the bottom adapter surface 14*b* and the top surface 14*a* of the work platform table 14 facially contact one another and the retainer element 64 of the fastener 58 is slidably received in the inverted T-shaped groove 18, the fastener 58 clamps the adapter member 50 and the work platform table 14 together.

Further, the adapter member 50 includes an adapter wall section 68 that extends perpendicularly relative to the flat plate 52 as viewed in cross section. The adapter wall section 68 and the side wall 14*c* of the work platform table 14 facially oppose each other when the adapter member 50 is releasably connected to the work platform table 14 as a shown in FIG. 4. The adapter wall section 68 includes two projections 70 at shown in FIGS. 2 and 4. The two projections 70 extend perpendicularly relative to the adapter wall section 68. Correspondingly, as a shown in FIGS. 4-5B, the side wall 14*c* of the work platform table 14 includes two holes 72 that extend thereinto Each of the two holes 72 is sized to slidably receive a respective one of the projections 70. However, a skilled artisan would appreciate that the adapter member 50 might only include one projection while correspondingly the work platform table 14 would then only include one hole 24.

Again, with reference to FIGS. 1-4, the folding work platform apparatus 10 is particularly adapted for use with a tool workpiece 74 such as, by way of example only and not by way of limitation, a conventional vice drawn in phantom in FIG. 4. A skilled artisan would appreciate that the tool workpiece 74 can be any one or a combination of a variety of tool workpieces such as a chain vice, a pipe cutter by itself or with a pipe support and the like. Note that the tool workpiece 74 is releasably connected to the flat plate 52 of the adapter member 50 by a plurality of tool fasteners i.e. by the nuts 56 threadably connected to the respective bolts 76 drawn in phantom in FIG. 4. The plurality of tool fasteners 56, 76 are slidably received in the respective tool fastener holes 62 so that the tool fasteners 56, 76 are operative for releasably connecting the tool workpiece 74 onto the top adapter surface 52*a* of the adapter member 52. In other words, the adapter member 50 is releasably connected to the tool workpiece 74 by nut-and-bolt combinations but can be releasably connected therefrom. It is appreciated that any other type of means for releasably connecting the tool workpiece 74 to the adapter member 50 can be used.

Figure 7:
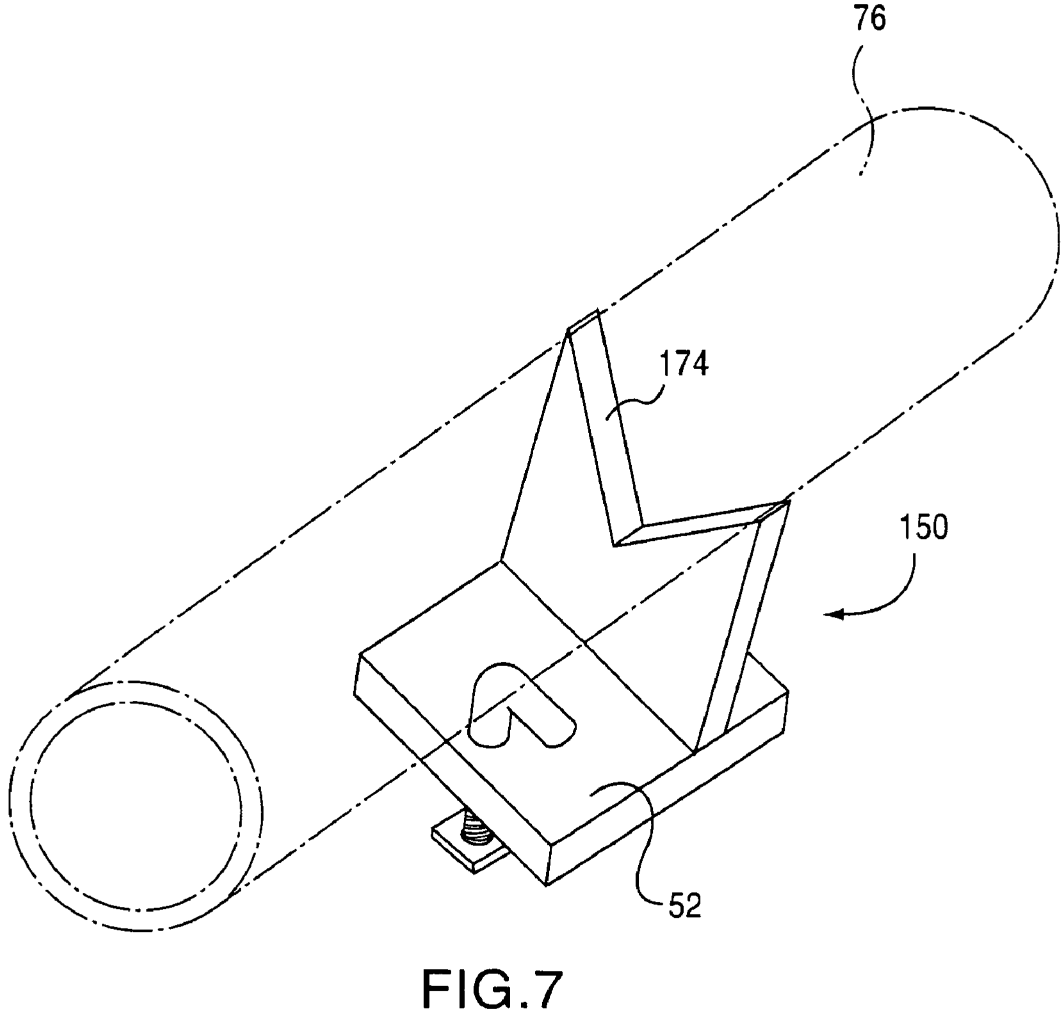
FIG. 7 is a perspective view of an alternative adapter member for releasably fastening to the work platform table.

FIG. 7 shows an alternative adapter member 150. The alternative adapter member 150 includes, by way of example only, a tool workpiece 174 in a form-of a V-shaped pipe support supporting a pipe section 76 drawn in phantom. The tool workpiece 174 is integrally formed with the flat plate 52 of the adapter member 150. Furthermore, note that the alternative adapter member 150 particularly excludes the adapter wall section 68 as described above. It is appreciated that without an adapter wall section 68, the alternative adapter member 150 can slide along the groove 18 and be clamped to the work platform table 14 at any location desired by the user.

Figure 8:
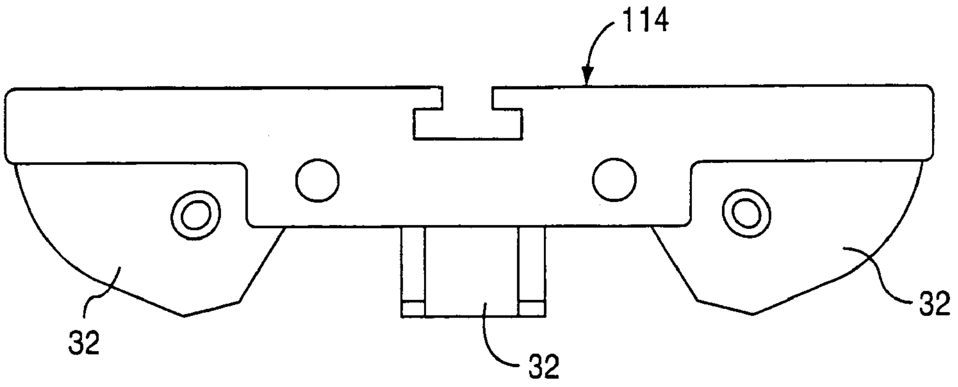
FIG. 8 is a partial front elevational view of a second exemplary embodiment of a work platform table without a pair of strip members but having the inverted T-shaped groove formed therein.

FIG. 8 illustrates a second exemplary embodiment of a work platform table 114. This work platform table 114 is similar to the work platform table 14 discussed above except that the inverted T-shaped groove 18 is formed without the strip members 24. The T-shaped groove 18 can be formed, for example, by machining a starting work platform cast or a starting work platform molded piece without a groove.

The present invention, may, however, be embodied in various different forms and should not be construed as limited to the exemplary embodiments set forth herein; rather, these exemplary embodiments are provided so that this disclosure will be thorough and complete and will fully convey the scope of the present invention to those skilled in the art.

What is claimed is:

1. A folding work platform apparatus adapted for use on a support surface, comprising:

a pair of longitudinally-extending strip members;

a work platform table having a top surface and a bottom surface disposed opposite the top surface and a side wall disposed between the top and bottom surfaces to define a thickness therebetween, the work platform table having a groove formed into the top surface and extending longitudinally completely across the top surface along a longitudinal axis, the groove including a first channel having a first width and a second channel disposed below the first channel and having a second width being less than the first width, the pair of strip members positioned longitudinally in the first channel and connected to the work platform table, the pair of strip members disposed apart from one another in the first channel to form a gap therebetween such that the gap and the second channel form an inverted T-shaped groove in the top surface of the work platform table;

at least three legs movably adjoining the bottom surface of the work platform table, the at least three legs movable to and between a folded state wherein the at least three legs extend from the bottom surface generally parallel with one another and an extended state wherein the at least three legs extend from the bottom surface generally angularly away from the bottom surface and from one another for supporting the work platform table on the support surface; and a sub-table positioned below the bottom surface of the work platform table and movable between a working position disposed away from the bottom surface and a stowed position disposed adjacent the bottom surface, the sub-table including a plurality of slots sized with at least a slot width and a slot depth sized to receive a leg width of a respective one of the at least three legs when the legs are in the folded state, each slot extending from an outer periphery of the sub-table toward a center portion of the sub-table.

2. A folding work platform apparatus according to claim 1, wherein the second channel is disposed centrally relative to the first channel as viewed in cross-section.

3. A folding work platform apparatus according to claim 1, further comprising at least three support members connected to the bottom surface of the work platform table, a respective one of the at least three support members configured to movably receive a connecting leg portion of a respective one of the at least a three legs.

4. A folding work platform apparatus according to claim 3, wherein each one of the at least three support members is a hinge support integrally formed with the bottom surface of the work platform table, each one of the connecting leg portions being pivotably connected to a respective one of the hinge supports by a pin.

5. A folding work platform apparatus according to claim 1, further comprising an adapter member operative to releasably connect to the work platform table.

6. A folding work platform apparatus according to claim 5, wherein the adapter member includes a flat plate with a top adapter surface and an opposite bottom adapter surface defining an adapter thickness therebetween, the bottom adapter surface facially contacting the top surface of the work platform table when the adapter member is releasably connected thereto, the adapter member including at least one adapter hole and a fastener hole extending through the flat plate.

7. A folding work platform apparatus according to claim 6, further comprising a fastener for releasably connecting the adapter member to the work platform table.

8. A folding work platform apparatus according to claim 7, wherein the fastener includes a threaded shaft sized slidably received the fastener hole formed in the flat plate of the adapter member, the fastener hole extending into and through the top adapter surface and the bottom adapter surface, a retainer element connected to one end of the threaded shaft and sized for slidable insertion in and along the groove and a thumbscrew threadably connected to the threaded shaft opposite the retainer element.

9. A folding work platform apparatus according to claim 6, wherein the adapter member includes an adapter wall section extending perpendicularly relative to the flat plate as viewed in cross section, the adapter wall section and the side wall of the work platform table facially oppose each other when the adapter member is releasably connected to the work platform table.

10. A folding work platform apparatus according to claim 9, wherein the adapter wall section includes at least one projection extending perpendicularly to the adapter wall section and wherein the side wall of the work platform table includes at least one hole extending thereinto and sized to slidably receive the at least one projection.

11. A folding work platform apparatus according to claim 1, wherein the at least three legs are three legs form a tripod arrangement.

12. A folding work platform apparatus adapted for use on a support surface, comprising:

a work platform table having a top surface and a bottom surface disposed opposite the top surface and a side wall disposed between the top and bottom surfaces to define a thickness therebetween, the work platform table having a groove formed into the top surface and extending longitudinally completely across the top surface along a longitudinal axis, the groove including a first channel having a first width and a second channel disposed below the first channel and having a second width being less than the first width, the pair of strip members positioned longitudinally in the first channel and connected to the work platform table, the pair of strip members disposed apart from one another in the first channel to form a gap therebetween such that the gap and the second channel form an inverted T-shaped groove in the top surface of the work platform table;

at least three legs movably adjoining the bottom surface of the work platform table, the at least three legs movable to and between a folded state wherein the at least three legs extend from the bottom surface generally parallel with one another and an extended state wherein the at least three legs extend from the bottom surface generally angularly away from the bottom surface and from one another for supporting the work platform table on the support surface;

a sub-table: and at least three links, wherein each one of the at least three legs includes a connecting leg portion, a support leg portion and an intermediate leg portion disposed between the connecting leg portion and the support leg portion the sub-table is positioned below the bottom surface of the work platform table and is movable between a working position disposed away from the bottom surface and a stowed position disposed adjacent the bottom surface, the sub-table includes a plurality of slots sized with at least a slot width and a slot depth sized to receive a leg width of a respective one of the at least three legs when the legs are in the folded state, each slot extends from an outer periphery of the sub-table toward a center portion of the sub-table, respective ones of the at least three links interconnect the sub-table and respective ones of the intermediate leg portions of the at least three legs.

13. A folding work platform apparatus according to claim 12, further comprising a plurality of sub-table insert sections formed on respective ones of the at least three links, each sub-table insert sections being sized and adapted to be received by a respective one of the plurality of slots when the at least three legs are in the extended state.

14. A folding work platform apparatus according to claim 13, wherein a first end of a respective one of the at least three links is pivotably adjoined to a sub-table bottom surface of the sub-table and a second end disposed opposite the first end of a respective one of the at least three links is pivotably adjoined at the intermediate portion of respective ones of the at least three legs.

15. A folding work platform apparatus according to claim 14, further comprising a height adjustment mechanism connected to a selected one of the at least three legs, the height adjustment mechanism operative to raise or lower the selected one of the support leg portions of the at least three legs.

16. A folding work platform apparatus adapted for use with a tool workpiece to support the tool workpiece on a support surface, the folding platform apparatus comprising:

a work platform table having a top surface, a bottom surface disposed opposite the top surface and a side wall extending between the top and bottom surfaces forming a thickness therebetween;

at least three legs movably adjoining the bottom surface of the work platform table and movable to and between a folded state wherein the at least three legs extend from the bottom surface generally parallel to one another and an extended state wherein the at least three legs extend from the bottom surface at an angle relative to the bottom surface and away from each other;

a sub-table connected to the at least three legs and movable to and between a working position wherein the sub-table is disposed apart from the bottom surface of the work platform table when the at least three legs are in the extended state and a stowed position wherein the sub-table is disposed adjacent the bottom surface of the work platform table when the at least three legs are in the folded state;

at least three links;

an adapter member including a flat plate with a top adapter surface and an opposite bottom adapter surface with an adapter hole and a fastener hole formed into and through the top and bottom adapter surfaces, the adapter member operative to releasably connect to the tool workpiece; and a fastener for releasably fastening the adapter member along with the tool workpiece to the work platform table, the fastener sized to extend through the fastener hole and to releasably connect the adapter member and work platform table together, wherein each one of the at least three legs includes a connectina leg portion, a support leg portion and an intermediate leg portion disposed between the connecting leg portion and the support leg portion, the sub-table is positioned below the bottom surface of the work platform table and is movable between a working position disposed away from the bottom surface and a stowed position disposed adjacent the bottom surface, the sub-table includes a plurality of slots sized with at least a slot width and a slot depth sized to receive a leg width of a respective one of the at least three legs when the legs are in the folded state, each slot extends from an outer periphery of the sub-table toward a center portion of the sub-table and the at least three links interconnect the sub-table and the intermediate leg portion of a respective one of the at least three legs.

17. A folding work platform apparatus according to claim 16, wherein the work platform table has a groove formed into the top surface in a form of an inverted T-shape and extending longitudinally along a longitudinal axis and the fastener includes a threaded shaft sized to be slidably received in the fastener hole, a retainer element connected to one end of the threaded shaft and sized for slidable insertion into and along the inverted T-shaped groove below the bottom adapter surface and a thumbscrew threadably connected to the threaded shaft and disposed above the top adapter surface, so that upon advancing the thumbscrew when the bottom adapter surface of the adapter member and the top surface of the work platform table facially contact one another and the retainer element is slidably received in the inverted T-shaped groove, the fastener clamps the adapter member and the work platform table together.

18. A folding work platform apparatus according to claim 16, further comprising a tool fastener and wherein the adapter member includes at least one tool fastener hole for slidably receiving the tool fastener operative for releasably connecting the tool workpiece onto the top adapter surface of the adapter member.

19. A folding work platform apparatus according to claim 16, further comprising a plurality of sub-table insert sections formed on respective ones of the at least three links, each sub-table insert sections being sized and adapted to be received by a respective one of the plurality of slots when the at least three legs are in the extended state.

20. A folding work platform apparatus adapted for use on a support surface, comprising:

a work platform table having a top surface, a bottom surface disposed opposite the top surface and a side wall extending between the top and bottom surfaces forming a thickness therebetween;

at least three legs movably adjoining the bottom surface of the work platform table and movable to and between a folded state wherein the at least three legs extend from the bottom surface generally parallel to one another and an extended state wherein the at least three legs extend from the bottom surface at an angle relative to the bottom surface and away from each other;

a sub-table connected to the at least three legs and movable to and between a working position wherein the sub-table is disposed apart from the bottom surface of the work platform table when the at least three legs are in the extended state and a stowed position wherein the sub-table is disposed adjacent the bottom surface of the work platform table when the at least three legs are in the folded state; and at least three links, wherein each one of the at least three legs includes a connecting leg portion, a support leg portion and an intermediate leg portion disposed between the connecting leg portion and the support leg portion, the sub-table is positioned below the bottom surface of the work platform table and is movable between a working position disposed away from the bottom surface and a stowed position disposed adjacent the bottom surface, the sub-table includes a plurality of slots sized with at least a slot width and a slot depth sized to receive a leg width of a respective one of the at least three legs when the legs are in the folded state, each slot extends from an outer periphery of the sub-table toward a center portion of the sub-table and the at least three links interconnect the sub-table and the intermediate leg portion of a respective one of the at least three legs.

21. A folding work platform apparatus according to claim 20, further comprising a plurality of sub-table insert sections formed on respective ones of the at least three links, each sub-table insert sections being sized and adapted to be received by a respective one of the plurality of slots when the at least three legs are in the extended state.

22. A folding work platform apparatus according to claim 20, wherein a first end of a respective one of the at least three links is pivotably adjoined to a sub-table bottom surface of the sub-table and a second end disposed opposite the first end of a respective one of the at least three links is pivotably adjoined at the intermediate portion of respective ones of the at least three legs.

* * * * *